United States Patent
Kim

(10) Patent No.: US 10,700,369 B2
(45) Date of Patent: Jun. 30, 2020

(54) METHOD OF DIAGNOSING LEVEL SENSOR FAILURE IN FUEL CELL WATER TRAP AND CONTROL UNIT USING THE SAME

(71) Applicants: HYUNDAI MOTOR COMPANY, Seoul (KR); KIA MOTORS CORPORATION, Seoul (KR)

(72) Inventor: Hyo-Seop Kim, Anseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 141 days.

(21) Appl. No.: 16/142,245

(22) Filed: Sep. 26, 2018

(65) Prior Publication Data

US 2019/0245227 A1    Aug. 8, 2019

(30) Foreign Application Priority Data

Feb. 2, 2018    (KR) .................. 10-2018-0013413

(51) Int. Cl.
*H01M 8/04664*    (2016.01)
*H01M 8/04828*    (2016.01)
(Continued)

(52) U.S. Cl.
CPC ......... *H01M 8/04664* (2013.01); *F24F 11/38* (2018.01); *F24F 13/222* (2013.01);
(Continued)

(58) Field of Classification Search
CPC ......... H01M 8/04156; H01M 8/04492; H01M 8/04514; H01M 8/04559; H01M 8/04664; H01M 8/04828; H01M 8/04843; H01M 8/04992; H01M 2250/20; G01F 23/261; G01F 23/266; G01F 25/0061; G02F 2201/009; G02F 2209/42; F24F 11/32;
(Continued)

(56) References Cited

U.S. PATENT DOCUMENTS 3,780,261 A * 12/1973 Eaton-Williams ........ F22B 1/30
                                                             392/326
6,778,868 B2 * 8/2004 Imamura ............. H04L 12/2825
                                                             700/79
(Continued)

FOREIGN PATENT DOCUMENTS

KR    20130037694 A * 4/2013
KR       101350183 B1 * 1/2014
(Continued)

*Primary Examiner* — Crystal J Barnes-Bullock
(74) *Attorney, Agent, or Firm* — Brinks Gilson & Lione

(57) ABSTRACT

A method of diagnosing level sensor failure in a fuel cell water trap, the method may include: determining whether a water level of a level sensor is changed in a fuel cell water trap, adding an amount of charge according to an operating time and comparing the added amount of charge with a preset threshold amount of charge, according to the result of the forcibly opening a drain valve according to determining whether a channel voltage of a specific channel is abnormal as the result of the comparison, and diagnosing a failure of the level sensor according to determining whether the channel voltage of the specific cell is recovered as a normal state when the drain valve is opened.

16 Claims, 3 Drawing Sheets

(51) Int. Cl.
*H01M 8/04537* (2016.01)
*H01M 8/04492* (2016.01)
*G01F 25/00* (2006.01)
*H01M 8/04119* (2016.01)
*F24F 11/38* (2018.01)
*F25D 21/14* (2006.01)
*F24F 13/22* (2006.01)

(52) U.S. Cl.
CPC ......... *F25D 21/14* (2013.01); *G01F 25/0061* (2013.01); *H01M 8/04156* (2013.01); *H01M 8/04514* (2013.01); *H01M 8/04544* (2013.01); *H01M 8/04559* (2013.01); *H01M 8/04843* (2013.01); *A47L 2401/09* (2013.01); *A47L 2501/02* (2013.01); *H01M 8/04492* (2013.01); *H01M 8/04828* (2013.01); *H01M 2250/00* (2013.01)

(58) Field of Classification Search
CPC ........ F24F 13/222; F25D 21/14; Y02E 60/50; A47L 15/023; A47L 15/0049; A47L 15/421; A47L 2401/06; A47L 2401/09; A47L 2501/01; A47L 2501/02; A47L 2501/26; A47L 2501/28; A47L 2501/34
See application file for complete search history.

(56) References Cited

U.S. PATENT DOCUMENTS

| | | | | |
|---|---|---|---|---|
| 6,863,805 | B1* | 3/2005 | Barreras, Sr. | B01D 21/0006 210/143 |
| 7,191,606 | B1* | 3/2007 | Dwyer | F24F 13/222 62/150 |
| 7,947,917 | B2* | 5/2011 | Kita | B23H 1/10 210/143 |
| 9,101,032 | B2* | 8/2015 | Kim | H05B 45/50 |
| 9,343,762 | B2* | 5/2016 | Jeon | H01M 8/04156 |
| 9,689,107 | B2* | 6/2017 | Joo | D06F 37/42 |
| 9,936,852 | B2* | 4/2018 | Forst | A47L 15/0049 |
| 10,424,798 | B2* | 9/2019 | Jeon | H01M 8/04395 |
| 2012/0291541 | A1* | 11/2012 | Liu | G01F 23/261 73/304 C |
| 2017/0322067 | A1* | 11/2017 | Shim | H01M 10/6567 |
| 2019/0190043 | A1* | 6/2019 | Jeong | H01M 8/04843 |

FOREIGN PATENT DOCUMENTS

| | | | | |
|---|---|---|---|---|
| KR | 2018-0002086 A | | 1/2018 | |
| KR | 20180002086 A | * | 1/2018 | |
| WO | WO-2012161217 A1 | * | 11/2012 | ........ H01M 8/04067 |

* cited by examiner

METHOD OF DIAGNOSING LEVEL SENSOR FAILURE IN FUEL CELL WATER TRAP AND CONTROL UNIT USING THE SAME

CROSS-REFERENCE TO RELATED APPLICATION

This application claims priority to and the benefit of Korean Patent Application No. 10-2018-0013413, filed on Feb. 2, 2018, the entire contents of which are incorporated herein by reference.

FIELD

The present disclosure relates to a method of diagnosing level sensor failure in a fuel cell water trap and a control unit using the same.

BACKGROUND

The statements in this section merely provide background information related to the present disclosure and may not constitute prior art.

A fuel cell converts chemical energy into electric energy by electrochemical reaction of hydrogen and oxygen, has a higher efficiency than an existing internal combustion engine, and produces water as a by-product of electrochemical reaction.

In the fuel cell, hydrogen as a fuel and oxygen (air) as an oxidant are respectively supplied to an anode (also called "fuel electrode" or "hydrogen electrode") and a cathode (also called "air electrode" or "oxygen electrode") of a membrane electrode assembly through the channel of a bipolar plate.

The hydrogen supplied to the anode is dissociated into hydrogen ions (protons, H+) and electrons (e⁻) by catalysts of electrode layers disposed at both sides of an electrolyte membrane. In this case, the hydrogen ions are transmitted to the cathode through the electrolyte membrane which is a cation exchange membrane, and the electrons are simultaneously transmitted to the cathode through a gas diffusion layer as a conductor and the bipolar plate.

At the cathode, the hydrogen ions supplied through the electrolyte membrane and the electrons transmitted through the bipolar plate react with the oxygen of air supplied to the cathode by an air supply device, thereby producing water. In this case, migration of the hydrogen ions causes electrons to flow through external conducting wires, which generates a current.

The humidity of air is very important for reaction in a fuel cell stack, and thus moisture is supplied to an air inlet by a humidifier for maintaining humidity. Air supplied with the moisture flows along the channel in the stack and reacts with hydrogen to produce water.

However, it is desired to remove the water produced by the reaction from the stack since it disturbs the flow of oxygen and hydrogen. Therefore, the water drained from the stack is collected in and discharged from a water trap.

That is, some of the moisture produced at the air electrode after the reaction flows to the hydrogen electrode, which disturbs the reaction in the fuel cell. Thus, there is a need for a water trap to discharge the produced condensate.

A drain valve is desired to discharge condensate from the water trap and a level sensor is desired to determine how much condensate is produced in the water trap.

If the level of the level sensor is not changed in response to the command to open the drain valve, it may be determined that the drain valve fails. However, we have discovered that it is difficult to determine whether or not the drain valve fails because, when the level sensor fails, the level thereof is not changed.

SUMMARY

The present disclosure provides a method of diagnosing level sensor failure in a fuel cell water trap, which diagnoses a failure of a level sensor installed to discharge condensate produced by operation of a fuel cell stack, thereby stably operating the fuel cell stack in spite of malfunction of the level sensor, and a control unit using the same.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, a method of diagnosing level sensor failure in a fuel cell water trap includes: determining, by a controller, whether a water level of a level sensor is changed in a fuel cell water trap, adding an amount of charge based on an operating time and comparing the added amount of charge with a preset threshold amount of charge, based on the result of the determination, forcibly opening a drain valve based on whether a channel voltage of a specific channel is abnormal as the result of the comparison, and diagnosing a failure of the level sensor based on whether the channel voltage of the specific cell is recovered as a normal state when the drain valve is opened.

In the forcibly opening a drain valve, when a measured FCRV (a fuel cell ratio voltage) value is less than an FCRV threshold or a measured FCDV (a fuel cell deviation voltage) value is more than an FCDV threshold, it may be determined that the channel voltage of the specific cell is abnormal so that the drain valve is forcibly opened.

In the diagnosing a failure of the level sensor, when a measured FCRV value is more than an FCRV threshold or a measured FCDV value is less than an FCDV threshold, it may be determined that the channel voltage of the specific cell is recovered as the normal state so that it is diagnosed that the level sensor fails.

It may indicate that the channel voltage is well distributed as the FCRV threshold is close to "1" or between "0" and "1".

It may indicate that the channel voltage is well distributed as the FCDV threshold is close to "0" or between "0" and "1".

In the adding an amount of charge, when the water level of the level sensor is not changed, the added amount of charge may be compared with the preset threshold amount of charge.

In the forcibly opening a drain valve, when it is determined that the added amount of charge is equal to or more than the threshold amount of charge, it may be determined that the channel voltage of the specific cell is abnormal.

In another form of the present disclosure, a control unit using a method of diagnosing level sensor failure in a fuel cell water trap includes at least one processor, and a memory for storing computer readable commands therein. The at least one processor is configured to cause the control unit to: determine whether a water level of a level sensor is changed in a fuel cell water trap, to add an amount of charge according to an operating time and compare the added amount of charge with a preset threshold amount of charge, based on the result of the determination, to forcibly open a drain valve based on determining whether a channel voltage of a specific channel is abnormal as the result of the comparison, and to diagnose a failure of the level sensor based on whether the channel voltage of the specific cell is recovered as a normal state when the drain valve is opened.

The at least one processor may cause the control unit to determine that the channel voltage of the specific cell is abnormal to forcibly open the drain valve, when a measured FCRV value is less than a FCRV threshold or a measured FCDV value is more than a FCDV threshold.

The at least one processor may cause the control unit to determine the channel voltage of the specific cell is recovered as the normal state and thus to diagnose that the level sensor fails, when a measured FCRV value is more than an FCRV threshold or a measured FCDV value is less than an FCDV threshold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
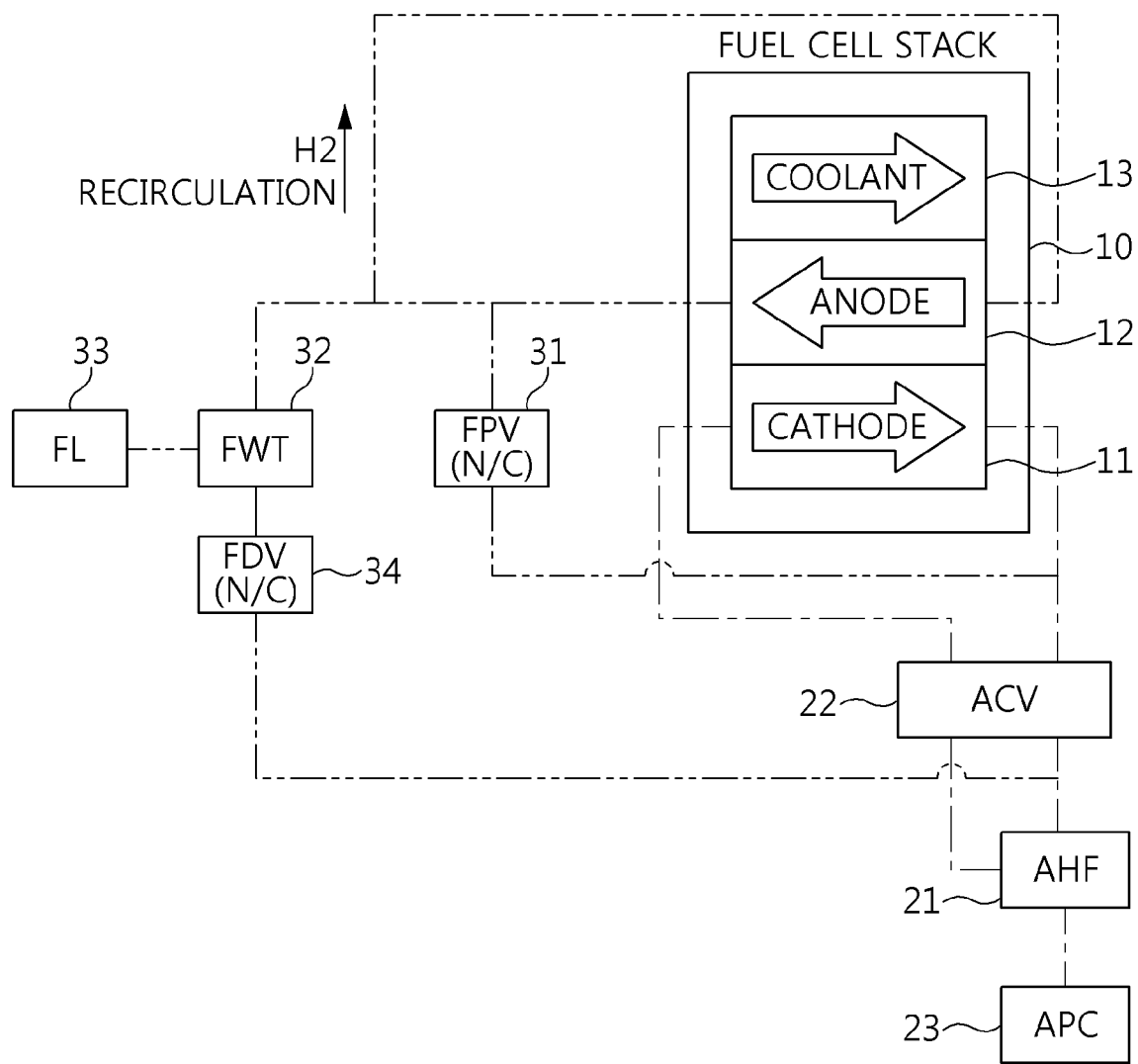
FIG. 1 is a diagram illustrating a fuel cell system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Detailed descriptions of functions or constructions well known in the art may be omitted to avoid unnecessarily obscuring the concepts of the present disclosure.

The terms and words used in the specification and claims should not be construed as their ordinary or dictionary sense. On the basis of the principle that the inventor can define the appropriate concept of a term in order to describe his/her own present disclosure in the best way, it should be construed as meaning and concepts for complying with the technical idea of the present disclosure.

Accordingly, the forms described in the specification and the construction shown in the drawings are nothing but an exemplary form of the present disclosure, and it does not cover all the technical ideas of the present disclosure. Thus, it should be understood that various changes and modifications may be made at the time of filing the present application.

In the drawings, the thicknesses or sizes of some components are exaggerated, omitted, or schematically illustrated for convenience of description and clarity. Also, the size or area of each component does not entirely reflect the actual size thereof.

In the whole description, it will be understood that when a component is referred to as being "comprising" and/or "including" any component, it does not exclude other components, but can further comprises the other components unless otherwise specified. In addition, it will be understood that when an element is referred to as being "connected" to another element, it can be "directly connected" to the other element or it can be "indirectly connected" to the other element with other elements being interposed therebetween.

As used in the specification and the appended claims, the singular forms are intended to include the plural forms as well, unless context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, and/or components thereof.

As used in the exemplary forms of the present disclosure, the term "unit" and/or "device" refers to software or a hardware structural element such as FPGA or ASIC, and the term "unit" and/or "device" performs some roles. However, the "unit" and/or "device" is not limited to software or hardware. The term "unit" and/or "device" can be configured to be stored in an addressable storage medium and to play at least one process. Accordingly, for example, the term "unit" and/or "device" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and the "unit" and/or "device" may be engaged by the smaller number of structural elements, and the "unit" and/or "device" may be divided by additional structural elements.

Reference will now be made in detail to exemplary forms of the present disclosure, examples of which are illustrated in the accompanying drawings, so as to be realized by a person of ordinary skill in the art. The present disclosure may, however, be embodied in different forms and should not be construed as limited to the forms set forth herein. In certain forms, the description irrelevant to the present disclosure may be omitted to avoid obscuring appreciation of the disclosure.

Exemplary forms of the present disclosure will be described below in more detail with reference to the accompanying drawings.

Figure 2:
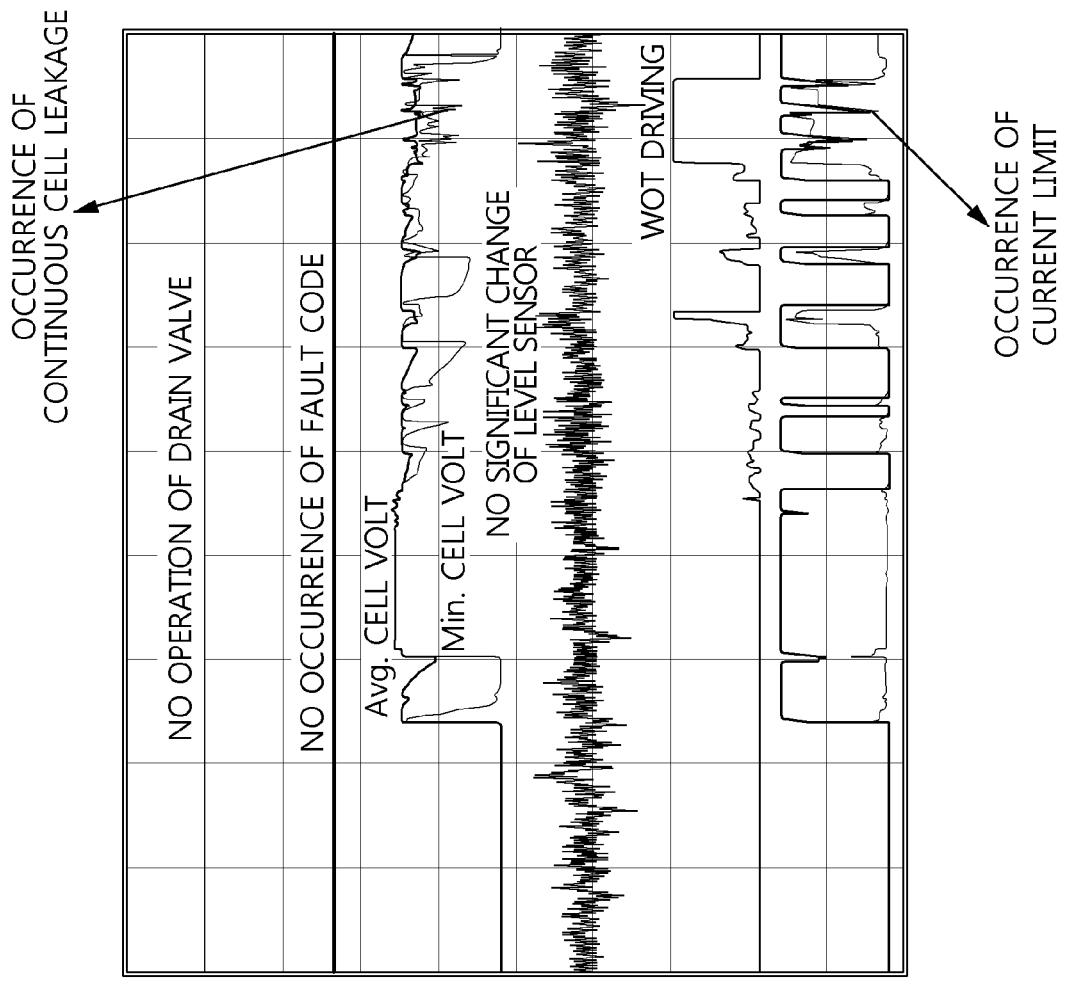
FIG. 2 is a graph illustrating a failure state of a level sensor.

FIG. 1 is a diagram illustrating a fuel cell system in one form of the present disclosure. FIG. 2 is a graph illustrating a failure state of a level sensor in one form of the present disclosure.

As illustrate in FIG. 1, in the fuel cell system, oxygen (air) and hydrogen as fuel are respectively supplied to a cathode 11 and an anode 12 of a membrane electrode assembly through the channel of a bipolar plate in a fuel cell stack 10. That is, the oxygen (air) is supplied to the cathode 11 of the fuel cell stack 10 and the hydrogen is supplied to the anode 12 of the fuel cell stack 10. The fuel cell stack 10 includes coolant 13 therein.

At the cathode 11, there are provided an air humidifier (AHF) 21 for maintaining the humidity of oxygen (air), which is important for reaction in the fuel cell stack 10, and valves, such as an air cut-off valve (ACV) 22 and an air pressure control valve (APC) 23, for controlling the supply of oxygen (air). The AHF 21 is used to supply moisture to an oxygen (air) inlet, and oxygen (air) supplied with the moisture flows along the channel in the fuel cell stack 10 and reacts with hydrogen to produce water.

However, it is desired to remove the water produced by the reaction from the fuel cell stack 10 since it disturbs the flow of oxygen and hydrogen.

Accordingly, at the anode 12, there are provided a fuel-line purge valve (FPV) 31, a fuel-line water trap (FWT) 32, a fuel-line level sensor (FL) 33, and a fuel-line drain valve (FDV) 34, to discharge impurities and condensate from the fuel cell stack 10.

That is, the FPV 31 is used to discharge the impurities (nitrogen, etc.) produced at the anode 12 of the fuel cell stack 10, and the FWT 32 is used to collect the condensate produced at the anode 12 of the fuel cell stack 10 to a certain level and then discharge it to the cathode 11 through the FDV 34.

Referring to FIG. 2, if the FL 33 fails, it is not changed while the fuel cell system operates. Hence, condensate is continuously accumulated in the FWT 32 since the FDV 34 is kept in a non-operation state.

In this case, the channel voltage of a specific cell is decreased, which may disrupt the driving of a vehicle.

A method of diagnosing level sensor failure in a fuel cell water trap, which accurately diagnoses the failure state of a level sensor and provides stability of a fuel cell system, will be described below with reference to FIG. 3.

Figure 3:
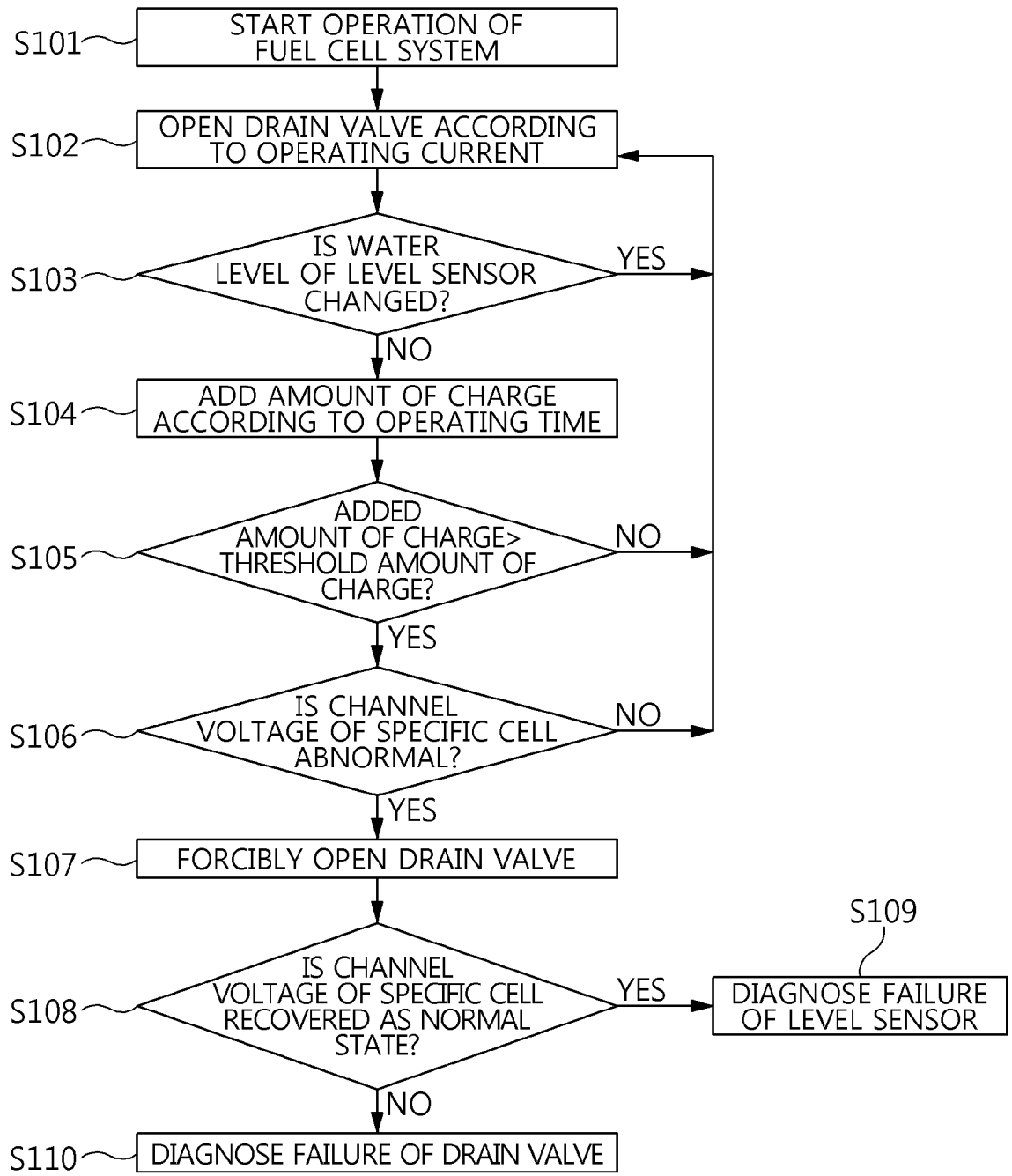
FIG. 3 is a flowchart illustrating a method of diagnosing level sensor failure in a fuel cell water trap.

FIG. 3 is a flowchart illustrating a method of diagnosing level sensor failure in a fuel cell water trap in one form of the present disclosure.

The method of diagnosing level sensor failure in a fuel cell water trap illustrated in FIG. 3 may be performed by a control unit (not shown) of a fuel cell system. The control unit may include at least one processor and a memory for storing computer readable commands therein. The processor executes the commands stored in the memory.

First, by the control unit, after a fuel cell stack begins to operate (S101), a drain valve is opened according to operating current (S102).

Next, the control unit determines whether a water level measured by a level sensor is changed in a fuel cell water trap (S103).

If the water level of the level sensor is not changed when the drain valve is opened according to the operating current (S103), the control unit may determine that the drain valve or the level sensor fails. Here, the drain valve is not operated due to its own failure or the failure of the level sensor.

In this case, the control unit adds an amount of charge according to an operating time (S104) and then compares the added amount of charge with a preset threshold amount of charge (S105).

This is to estimate how much condensate is produced according to the operating time by adding the amount of charge generated according to the operating time since the amount of charge generated according to the operating time is proportional to the amount of condensate produced according to the operating time in some degree.

Here, the threshold amount of charge is a maximum threshold amount of charge desired to open the drain valve and is an amount of charge preset through measurement in advance. The threshold amount of charge may be set larger than the actual threshold amount of charge desired to open the drain valve.

Through this, the control unit determines the time desired to discharge the condensate accumulated in the water trap. That is, when it is determined that the added amount of charge is equal to or more than the threshold amount of charge (S105), the control unit may determine that there is a need to discharge the condensate accumulated in the water trap.

In addition, when it is determined that the added amount of charge is equal to or greater than the threshold amount of charge (S105), the control unit determines whether the channel voltage of a specific cell is abnormal (S106). This is to determine whether the channel voltage of the specific cell drops when the level of the level sensor is not changed during operation and the drain valve is not operated so that condensate is continuously accumulated in the water trap.

In this case, the control unit measures a fuel cell ratio voltage (FCRV) and a fuel cell deviation voltage (FCDV) and compares them with respective thresholds, in order to determine whether the channel voltage of the specific cell is abnormal.

In detail, when the measured FCRV value is less than the FCRV threshold (i.e., measured FCRV value<FCRV threshold) or the measured FCDV value is more than the FCDV threshold (i.e., measured FCDV value>FCDV threshold), the control unit determines that the channel voltage of the specific cell drops and is therefore abnormal.

Here, the FCRV threshold is based on a fuel cell ratio voltage, and it indicates that the channel voltage is well distributed as the FCRV threshold is close to "1" or between "0" and "1". For example, the FCRV threshold may be set as 0.8. In this case, when the measured FCRV value is less than the FCRV threshold of 0.8 (i.e., measured FCRV value<0.8), the control unit determines that the channel voltage of the specific cell is abnormal.

In addition, the FCDV threshold is based on a fuel cell deviation voltage, and it indicates that the channel voltage is well distributed as the FCDV threshold is close to "0" or between "0" and "1". For example, the FCDV threshold may be set as 80 mV. In this case, when the measured FCDV value is equal to or more than the FCDV threshold of 80 mV (i.e., measured FCDV value>80 mV), the control unit determines that the channel voltage of the specific cell drops and is therefore abnormal.

Next, when it is determined that the channel voltage of the specific cell is abnormal (S106), the control unit forcibly opens the drain valve to forcibly discharge the condensate in the water trap (S107).

At this time, the control unit determines whether the channel voltage of the specific cell is recovered as a normal state (S108). In detail, when the measured FCRV value is more than the FCRV threshold (i.e., measured FCRV value>FCRV threshold) or the measured FCDV value is less than the FCDV threshold (i.e., measured FCDV value<FCDV threshold), the control unit determines that the channel voltage of the specific cell is recovered as the normal state.

That is, when the drain valve is operated in response to the command of the control unit to forcibly open the drain valve, the condensate in the water trap is forcibly discharged so that the water level is dropped. Accordingly, it can be seen that the channel voltage of the specific cell is recovered as the normal state.

Finally, the control unit diagnoses that the level sensor fails because the water level of the level sensor is not changed, and the failure of the level sensor is confirmed (S109).

Additionally, when the channel voltage of the specific cell is not recovered as the normal state even by the command to forcibly open the drain valve (S108), the control unit may diagnose that the drain valve fails because it is not operated, thereby confirming the failure of the drain valve (S110).

As such, the control unit may diagnose the failure of the level sensor installed to discharge the condensate produced by the operation of the fuel cell stack, to stably operate the fuel cell stack in spite of the malfunction of the level sensor.

Next, when the control unit diagnoses the failure of the level sensor, it is possible to stably operate the fuel cell system in a manner that reduces the amount of condensate by limiting a current or increasing an operating temperature.

In addition, the control unit may diagnose the failure of the level sensor even when the fuel cell stack is deteriorated, based on a map configured of the fuel cell ratio voltage or the fuel cell deviation voltage.

In accordance with exemplary forms of the present disclosure, it is possible to stably operate the fuel cell stack in spite of the malfunction of the level sensor by diagnosing the failure of the level sensor installed to discharge condensate produced by the operation of the fuel cell stack.

In addition, since the present disclosure does not determine the failure of the level sensor when the level thereof is not merely changed but accurately predicts the failure of the level sensor using the fuel cell ratio voltage, the fuel cell deviation voltage, or the like, it is possible to stably operate the fuel cell system by limiting a current or increasing an operating temperature.

The method in the forms of the present disclosure may be implemented in a program command form executable by various computer means and recorded in a computer readable medium. The computer readable medium may include one or a combination of a program command, a data file, and a data structure. The program command recorded in the medium may be specially designed and configured for the present disclosure, or may be publicly known to and used by those skilled in the computer software field. Examples of the computer readable recording medium include a magnetic media such as a hard disk, a floppy disk, or a magnetic tape, an optical media such as a CD-ROM or a DVD, a magneto-optical media such as a floptical disk, and a hardware device which is specifically configured to store and examples of the program command such as a ROM, a RAM, and a flash memory include a machine language code prepared by a compiler and a high-class language code which may be executed by a computer by using an interpreter, and the like.

While the present disclosure has been particularly shown and described with reference to exemplary forms thereof, it will be understood by those skilled in the art that various changes in form and details may be made therein without departing from the spirit and scope of the present disclosure. The exemplary forms should be considered in descriptive sense only and not for purposes of limitation. Therefore, the scope of the present disclosure is defined not by the detailed description of the present disclosure, and all differences within the scope will be construed as being included in the present disclosure.

What is claimed is:

1. A method of diagnosing level sensor failure in a fuel cell water trap, the method comprising the steps of:
    determining, by a controller, whether a water level of a level sensor is changed in a fuel cell water trap;
    adding, by the controller, based on a result of the determination, an amount of charge that is based on an operating time and comparing the added amount of charge with a preset threshold amount of charge;
    forcibly opening a drain valve, by the controller, based on a determination of whether a channel voltage of a specific channel is abnormal as the result of the comparison; and
    diagnosing, by the controller, a failure of the level sensor based on whether the channel voltage of the specific cell is recovered as a normal state when the drain valve is opened.

2. The method of claim 1, wherein, in the step of forcibly opening the drain valve, when a measured fuel cell ratio voltage (FCRV) value is less than a FCRV threshold or a measured fuel cell deviation voltage (FCDV) value is more than a FCDV threshold, the channel voltage of the specific cell is determined as being abnormal so that the drain valve is forcibly opened.

3. The method of claim 2, wherein the channel voltage of the specific cell is determined as well distributed when the FCRV threshold is close to "1" or between "0" and "1".

4. The method of claim 2, wherein the channel voltage of the specific cell is determined as well distributed when the FCDV threshold is close to "0" or between "0" and "1".

5. The method of claim 1, wherein, in the step of diagnosing the failure of the level sensor, when a measured fuel cell ratio voltage (FCRV) value is greater than a FCRV threshold or a measured fuel cell deviation voltage (FCDV) value is less than a FCDV threshold, the channel voltage of the specific cell is determined as being recovered as a normal state so that the level sensor is diagnosed as being failed.

6. The method of claim 5, wherein the channel voltage of the specific cell is determined as well distributed when the FCRV threshold is close to "1" or between "0" and "1".

7. The method of claim 5, wherein the channel voltage of the specific cell is determined as well distributed when the FCDV threshold is close to "0" or between "0" and "1".

8. The method of claim 1, wherein, in the step of adding the amount of charge, when the water level of the level sensor is not changed, the added amount of charge is compared with the preset threshold amount of charge.

9. The method of claim 1, wherein, in the step of forcibly opening the drain valve, when the added amount of charge is equal to or more than the preset threshold amount of charge, the channel voltage of the specific cell is determined as being abnormal.

10. A control unit using a method of diagnosing level sensor failure in a fuel cell water trap, the control unit comprising:
    a processor; and
    a memory configured to store computer readable commands therein, wherein the processor is configured to cause the control unit to:
        determine whether a water level of a level sensor is changed in a fuel cell water trap;
        add, based on a result of the determination, an amount of charge that is based on an operating time, compare the added amount of charge with a preset threshold amount of charge;
        forcibly open a drain valve based on whether a channel voltage of a specific channel is abnormal as the result of the comparison; and
        diagnose a failure of the level sensor based on whether the channel voltage of the specific cell is recovered as a normal state when the drain valve is opened.

11. The control unit of claim 10, wherein when a measured fuel cell ratio voltage (FCRV) value is less than a FCRV threshold or a measured fuel cell deviation voltage (FCDV) value is greater than a FCDV threshold, the control unit is configured to determine that the channel voltage of the specific cell is abnormal and to forcibly open the drain valve.

12. The control unit of claim 11, wherein the channel voltage of the specific cell is determined as well distributed when the FCRV threshold is close to "1" or between "0" and "1".

13. The control unit of claim 11, wherein the channel voltage of the specific cell is determined well distributed when the FCDV threshold is close to "0" or between "0" and "1".

14. The control unit of claim 10, wherein when a measured fuel cell ratio voltage (FCRV) value is greater than a FCRV threshold or a measured fuel cell deviation voltage (FCDV) value is less than a FCDV threshold, the processor is configured to cause the control unit to determine that the channel voltage of the specific cell is recovered as a normal state and thus to diagnose that the level sensor fails.

15. The control unit of claim 14, wherein the channel voltage of the specific cell is determined as well distributed when the FCRV threshold is close to "1" or between "0" and "1".

16. The control unit of claim 14, wherein the channel voltage of the specific cell is determined as well distributed when the FCDV threshold is close to "0" or between "0" and "1".

* * * * *